June 29, 1954 L. GADDONI 2,682,387
VALVE SPRING ASSEMBLY
Filed Nov. 26, 1947 2 Sheets-Sheet 1
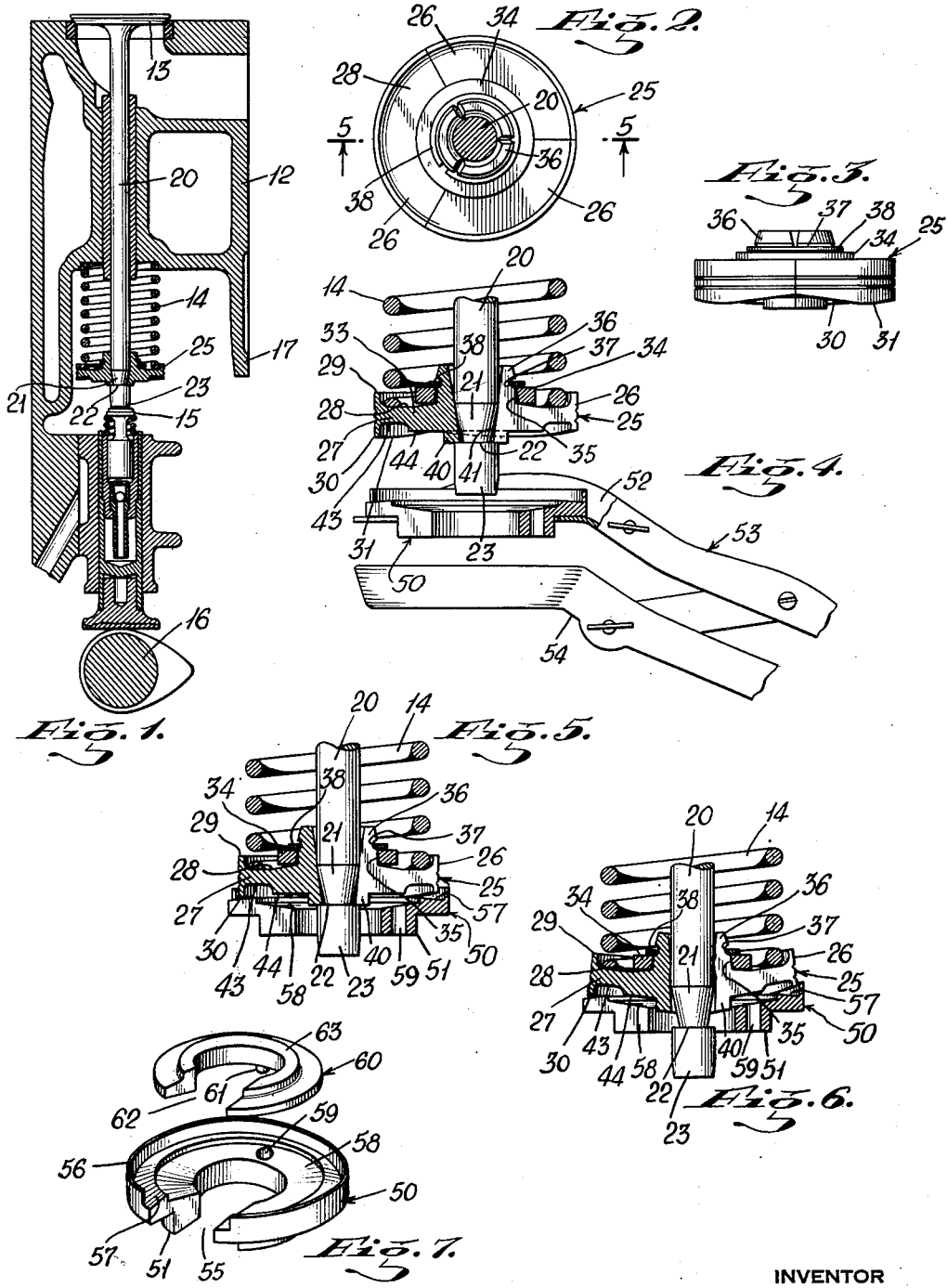
INVENTOR
LOUIS GADDONI
BY Chas. K. Phillips
His ATTORNEY June 29, 1954 L. GADDONI 2,682,387
VALVE SPRING ASSEMBLY
Filed Nov. 26, 1947 2 Sheets-Sheet 2
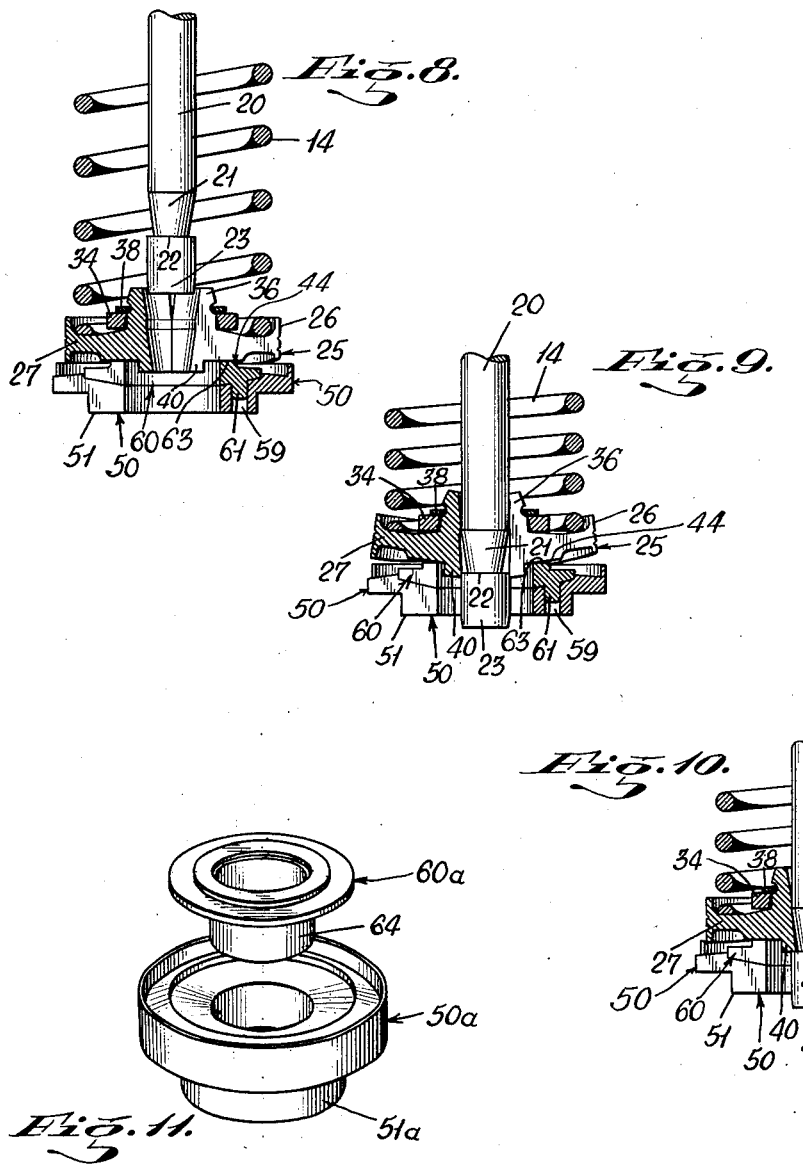
INVENTOR
LOUIS GADDONI
BY Chas. K. Phillips
His ATTORNEY Patented June 29, 1954

2,682,387

UNITED STATES PATENT OFFICE 2,682,387

VALVE SPRING ASSEMBLY

Louis Gaddoni, New Rochelle, N. Y.

Application November 26, 1947, Serial No. 788,127

1 Claim. (Cl. 251—337)

This invention relates to valve spring assemblies and more particularly to an improved spring seat and retainers therefor.

In order to grind and face valves and valve seats of an internal combustion motor it is necessary to disconnect the spring seat and its retainers from the valve stem to permit dismounting of the valve. The spring seat is generally in the form of a disk provided with an aperture receiving the valve stem and one common form of disk retainer consists of two semi-cylindrical locking members or keys provided on their inner faces with ribs to be held in grooves in the valve stem by the walls of the aperture in the spring seat. In mounting the spring seat on the valve stem the spring seat is raised against the compression of the spring far enough to permit the assembling of the keys with the valve stem and then the spring seat is lowered to surround and retain the keys in position. When the valve is to be removed, the spring seat is raised on the valve stem against the resistance of the spring to free the keys. These operations are performed by a spring compressor which engages the upper face of the valve and the lower face of the spring seat or by a lifter which engages the lower face of the spring seat and the upper face of the part of the engine block in which the valve tappets are mounted. These operations are carried out with great difficulty because of inaccessibility and great care is required to prevent the keys from dropping into the crank case during mounting and dismounting of the valves, requiring dropping the crank case to recover the same in case other keys are not readily available.

The main object of my invention is the provision of a spring seat and key construction in which the keys or retainers are an inseparable part of the spring seat.

Other objects consist in the provision of a spring seat and key or retainer means so constructed that the retainer means will automatically snap into engagement with a groove on the valve stem as the spring is given the proper compression and the spring seat is moved to position the retainer means opposite the groove on the valve stem, the provision of means whereby the pressure of the spring is utilized to move the retainer means into the groove and to hold the same in the groove as upward pressure on the spring seat and spring is released and the provision of means whereby the pressure of the spring may be utilized to disengage the retainer means from the groove in the valve stem and hold the same disengaged to clear the groove in the valve stem as the pressure on the spring seat and spring is released.

Other objects and advantages will become apparent as the invention is described in connection with the accompanying drawing in which, Figure 1 is a transverse vertical section through an engine block showing a valve equipped with my improved combined spring seat and retainers, Figure 2 is a top view of my combined spring seat and retainers, Figure 3 is an edge view of the same, Figure 4 is a vertical section through a valve spring, spring seat and retainer means locked on the valve stem, and of a disassembling appliance or tool used in conjunction with a lifter for compressing the spring and causing the spring to move the retainers out of the groove on the valve stem, Figure 5 is a vertical section on the line 5—5 on Figure 2, showing said appliance in engagement with an outer section of the lower face of the spring seat, Figure 6 is a view similar to Figure 5 showing said appliance raised and cooperating with said spring seat to utilize the pressure of said spring to disengage the retainers from the groove in the valve stem and to hold the same disengaged, Figure 7 shows in perspective view one form of a set of appliances used to facilitate connection and disconnection of the spring seat and valve stem, Figure 8 is a view similar to those in Figures 5 and 6 showing the use of a second appliance nested in said first mentioned appliance, and adapted to engage a different and inner section of the lower face of the spring seat to cause the spring when under compression to urge the retainers into locking position, Figure 9 is a view similar to that in Figure 8 showing the retainers about to be snapped into the groove on the valve stem upon further compression of the spring, Figure 10 is a view similar to that in Figure 9 just after the retainers have snapped into the groove on the valve stem, and Figure 11 is an exploded perspective view of a modified form of set of appliances or tools.

In Figure 1 is disclosed an engine block 12, a valve 13, a valve spring 14, a valve tappet 15 and a cam shaft 16 all of conventional construction. The engine block 12 is provided in this instance with a fixed apron 17 to emphasize the inaccessibility of the valve spring, spring seat and retainers therefor.

The stem 20 of the valve 13 is preferably provided with a groove 21 providing a shoulder 22 for locking engagement therewith of retaining means on a spring seat 25. The lower end of the valve stem is tapered as at 23 to facilitate assembling of the spring seat on the valve stem. These parts will be described in detail by reference to other figures.

As shown in Figure 2 the spring seat 25 preferably consists of three identical members 26 each in the form of a sector of a disk to constitute when assembled a circular disk for supporting the lower end of the spring 14 on the valve stem 20.

Referring to Figures 2 to 6 and 8 to 10, the member 26 comprises a horizontal portion or body 27 provided on its upper side with an annular horizontal face 28 on which the spring 14 is seated. On its outer edge is provided an upstanding spring retaining flange 29, and a downwardly extending bearing flange 30 provided with a convexly arcuate edge 31 for purposes which will appear later.

Inwardly of the annular horizontal face 28 is an annular upwardly and inwardly inclined face 33 constituting a support and bearing for a retaining and fulcruming annular ring 34 provided with an inner conical face 35 with which cooperates an upwardly extending arcuate lug or flange 36 on the inner end of the member 26. The outer face of the flange or lug 36 is rounded transversely and is grooved as at 37 to receive a split retaining ring 38 to hold the retaining and fulcruming ring 34 in position as shown.

The inner end of the member 26 is also provided with a downwardly projecting lug 40 adapted to rock into the groove 21 and have its lower end engage and rest on the shoulder 22 to hold the spring seat 25 on the valve stem 20. The upper wall of the groove is preferably conical as at 41 to provide clearance for movement of the lug 40 over the shoulder 22. The inner face of the lug 40 and the inner edge of the body portion of the member 26 are shaped to conform to the conical wall 41 of the groove 21 when the spring seat 25 is locked to the valve stem 20 as shown in Figures 1, 4, 5 and 10, see also Figure 8.

The inner face of the upwardly projecting lug 36 is rounded to conform generally to the body of the valve stem when the lug 40 is withdrawn from the groove 21 as shown in Figures 6 and 9. As shown in Figures 2 and 3, the side edges of the lug 36 are cut away to provide clearance to permit the members 26 to be rocked from the position shown in Figure 5 to the position shown in Figure 6.

The lower face of the body portion 27 of the member 26 inwardly of the flange 30 is cut away as at 43 to provide clearance for the rocking movement of the member 26 with respect to an appliance employed in disconnecting the spring seat from the valve. Between said groove and the lug 40 is a flat annular face 44 adapted to be engaged by an appliance used in connecting the spring seat to the valve stem.

It is now obvious that with the parts in the position shown in Figure 4 the spring seat 25 is held locked to the valve stem 20 by the expansive pressure of the valve spring 14 which holds the members 26 in the locked position shown with the lugs 40 in engagement with the shoulders 22. By applying pressure to the edges 31 of the flanges 30 the members 26 are rocked from the position shown in Figures 4 and 5 to the position shown in Figure 6 in which position the lugs 40 are clear of the shoulder 22 on the valve stem thereby unlocking the spring seat from the valve stem. In this operation as upward pressure is applied on the flanges 30 the valve spring 14 is slightly compressed and acting as a fulcrum on the members 26 it opposes the upward movement of the inner ends of the members causing the members to rock about the retaining ring 34 and withdraw the lugs 40 from the shoulders 22.

With the parts in the position shown in Figure 8, an application of pressure on the surface 44 of the members 26 will raise the spring seat 25 and compress the valve spring 14 as shown in Figure 9 in which position the force exerted by the compressed valve spring 14 tends to rock the lugs 40 over the shoulder 22 and will effect this when the parts are moved into the position shown in Figure 10 and hold the lugs 40 engaged over the shoulder 22 when pressure on the surface 44 is removed.

For the purpose of facilitating applying pressure on the flange 30 for disconnecting the spring seat 25 from the valve stem 14 and for applying pressure on the surface 44 for connecting the spring seat to the valve stem I have provided the devices 50 and 60 shown in Figure 7. These devices may be constructed for separate use but I prefer to construct them so the device 50 may be used alone for dismounting the spring seat, that the device 60 may be set into the device 50 for mounting the spring seat and so that the two devices may be kept and stored together in a circular container (not shown) which may be held between the jaws of a spring compressor for ready use and to prevent loss.

The device or appliance 50 is generally annular and is provided on its lower face at its inner edge with a circular flange 51 adapted to be received in correspondingly shaped apertures or slots in the spring seat engaging arm 52 of a lifter 53 or of a compressor not shown to hold the same assembled therewith as the lifter is moved into and out of position under the spring seat. In the use of the lifter shown the lower arm 54 of the lifter is forked to clear the valve tappet to rest on the engine block.

As shown the piece 50 is slotted at 55 to clear the valve stem and/or tappet so that it may be moved into the position shown in Figure 4 but closer to and directly under the spring seat 25. The upper circumferential edge of the piece 50 is provided with an upstanding flange 56 to encircle the spring seat 25 as shown in Figures 5 and 6 and support it thereon for removal from the engine. Its upper face is provided with an outwardly inclined face 57 for engagement with the rounded edges 31 of the flanges 30 on the members 26 of the spring seat 25. This facilitates the rocking movement of the members 26 from the position shown in Figure 5 to that shown in Figure 6 and resists or opposes rocking movement in the opposite direction when the piece 50 is lowered thereby ensuring that the lugs 40 will clear the shoulder 22 as the piece 50 and spring seat are lowered for removal from the valve stem and engine block.

The piece 50 (Figure 7) is also provided with a depressed seat 58 to receive the piece 60 and with a recess 59 to receive a pin 61 on the piece 60 to aline a slot 62 in the piece 60 with the slot 55 in the piece 50.

The inner edge of the piece 60 is provided with an upstanding operating flange 63 for applying pressure on the members 26 at their faces 44 as shown in Figures 8, 9 and 10.

In Figure 8 the parts are in position to compress the valve spring 14 and to raise the spring seat 26 and connect it to the valve stem 20. The lifter or compressor carrying the nested pieces 50 and 60 and the nested spring seat 25 is operated to raise these parts and compress the valve spring. As the parts are raised into the position shown in Figure 9, the pressure of the spring 14 urges the lugs 40 against the valve stem and as the lugs 40 clear the shoulders 22, the members 26 are rocked about the ring 34 with the faces 44 sliding on the flange 63 until the lugs 40 are in the locking position over the shoulder 22 on the valve stem as shown in Figure 10. The valve spring will hold the lugs in engagement with the shoulder as the actuating devices are lowered.

If desired and in the case where the valve tappets are removed or in other cases where feasible, the pieces 50 and 60 may be circumferentially continuous as shown at 50a and 60a Figure 11. In this case the member 60a may be provided with a hollow cylindrical downwardly extending projection 64 to fit and extend into a hollow cylindrical downwardly extending projection 51a on the piece 50a.

While I have described my invention in detail with reference to a preferred embodiment shown, it is to be understood that I do not intend this to act as a limitation on the scope of the appended claim in which I intend to cover all equivalents covered by a permissible construction of the terms thereof.

What is claimed is:

A valve seat for attachment to a grooved valve stem, comprising at least three sectors assembled to surround and engage a valve stem and providing an annular spring seating surface on their upper faces, each sector comprising upwardly and downwardly extending lugs at its inner end for engagement with said valve stem, a continuous ring surrounding said upwardly extending lugs, said downwardly extending lugs adapted to be seated in the groove of said stem, and said sectors provided with tool engaging surfaces on their lower faces exteriorly and interiorly of said annular spring seating surface, said surfaces exteriorly of said annular spring seating surface comprising a downwardly extending flange located at the rims of the sectors and provided with convex edges arcuate in the direction of the length of the flanges.

References Cited in the file of this patent

UNITED STATES PATENTS

| Number | Name | Date |
|---|---|---|
| 753,755 | Stratton | Mar. 1, 1904 |
| 1,234,967 | Throp | July 31, 1917 |
| 1,327,539 | Finney | Jan. 6, 1920 |
| 1,329,321 | Ellis | Jan. 27, 1920 |
| 1,400,027 | Coddington | Dec. 13, 1921 |
| 1,554,227 | Nickol | Sept. 22, 1925 |
| 1,597,029 | Fisher | Aug. 24, 1926 |
| 1,761,925 | Lamdman | June 3, 1930 |
| 1,775,069 | Finney | Sept. 2, 1930 |
| 1,930,894 | Gorman | Oct. 17, 1933 |

FOREIGN PATENTS

| Number | Country | Date |
|---|---|---|
| 492,114 | France | Mar. 4, 1919 |